United States Patent [19]
Logan et al.

[11] Patent Number: 5,697,644
[45] Date of Patent: Dec. 16, 1997

[54] LOW-PROFILE MODULAR FENDER FLARE

[75] Inventors: Gerald A. Logan, 2154 NE. Estate Dr., Hillsboro, Oreg. 97124; Jon S. Elliott, Hillsboro, Oreg.

[73] Assignee: Gerald A. Logan, Hillsboro, Oreg.

[21] Appl. No.: 543,841

[22] Filed: Oct. 23, 1995

[51] Int. Cl.$^6$ ................................................ B62D 25/18
[52] U.S. Cl. ........................ 280/848; 296/198; 52/716.5
[58] Field of Search .................... 296/1.1, 198, 93, 296/196, 197; 280/847, 848, 153.5, 849–851; 52/716.5, 800.1, 800.11; 428/31; 49/62; 293/128

[56] References Cited

U.S. PATENT DOCUMENTS

| | | | |
|---|---|---|---|
| 1,719,646 | 7/1929 | Blair | 280/847 |
| 2,264,228 | 11/1941 | Wagner | 296/1.1 |
| 3,495,673 | 2/1970 | Yazejian | 280/848 X |
| 4,617,209 | 10/1986 | Ives | 293/128 X |
| 4,620,745 | 11/1986 | Jacobs | 296/198 |
| 4,678,198 | 7/1987 | Nomura | 296/198 X |
| 4,784,430 | 11/1988 | Biermacher | 296/198 |
| 5,238,268 | 8/1993 | Logan | 296/198 X |
| 5,314,230 | 5/1994 | Hutchison et al. | 296/197 X |
| 5,340,154 | 8/1994 | Scott | 296/198 |

FOREIGN PATENT DOCUMENTS

| | | | |
|---|---|---|---|
| 32047 | 8/1922 | Denmark | 280/852 |
| 129067 | 12/1984 | European Pat. Off. | |
| 138233 | 4/1985 | European Pat. Off. | 280/847 |
| 794419 | 2/1936 | France | 296/151 |
| 1430800 | 12/1968 | Germany | |
| 57471 | 3/1986 | Japan | 296/198 |
| 194956 | 8/1987 | Japan | 296/198 |
| 41986 | 2/1990 | Japan | 296/198 |
| 204145 | 8/1990 | Japan | 296/198 |
| 1075302 | 7/1967 | United Kingdom | 52/716.5 |
| 2151569 | 7/1985 | United Kingdom | |

*Primary Examiner*—Dennis H. Pedder
*Attorney, Agent, or Firm*—Kolisch, Hartwell, Dickinson, McCormack & Heuser

[57] ABSTRACT

A low-profile modular fender flare having plural contour pieces is provided, the pieces being sized to accommodate packaging of the fender flare in a container of conventional size. The contour pieces are configured for attachment to the vehicle body, each piece being configured for attachment adjacent a particular portion of a vehicle wheel opening. The fender flare is assembled by combination of plural contour pieces including a brow piece with one or more associated leg pieces. The brow piece extends generally horizontally along an upper edge of the wheel opening. The leg pieces extend generally vertically along the side edges of the wheel opening. The brow piece defines an interior of predetermined contour, each leg piece having an alignment tab with an exterior contoured to fittedly engage the interior of the brow piece.

10 Claims, 3 Drawing Sheets

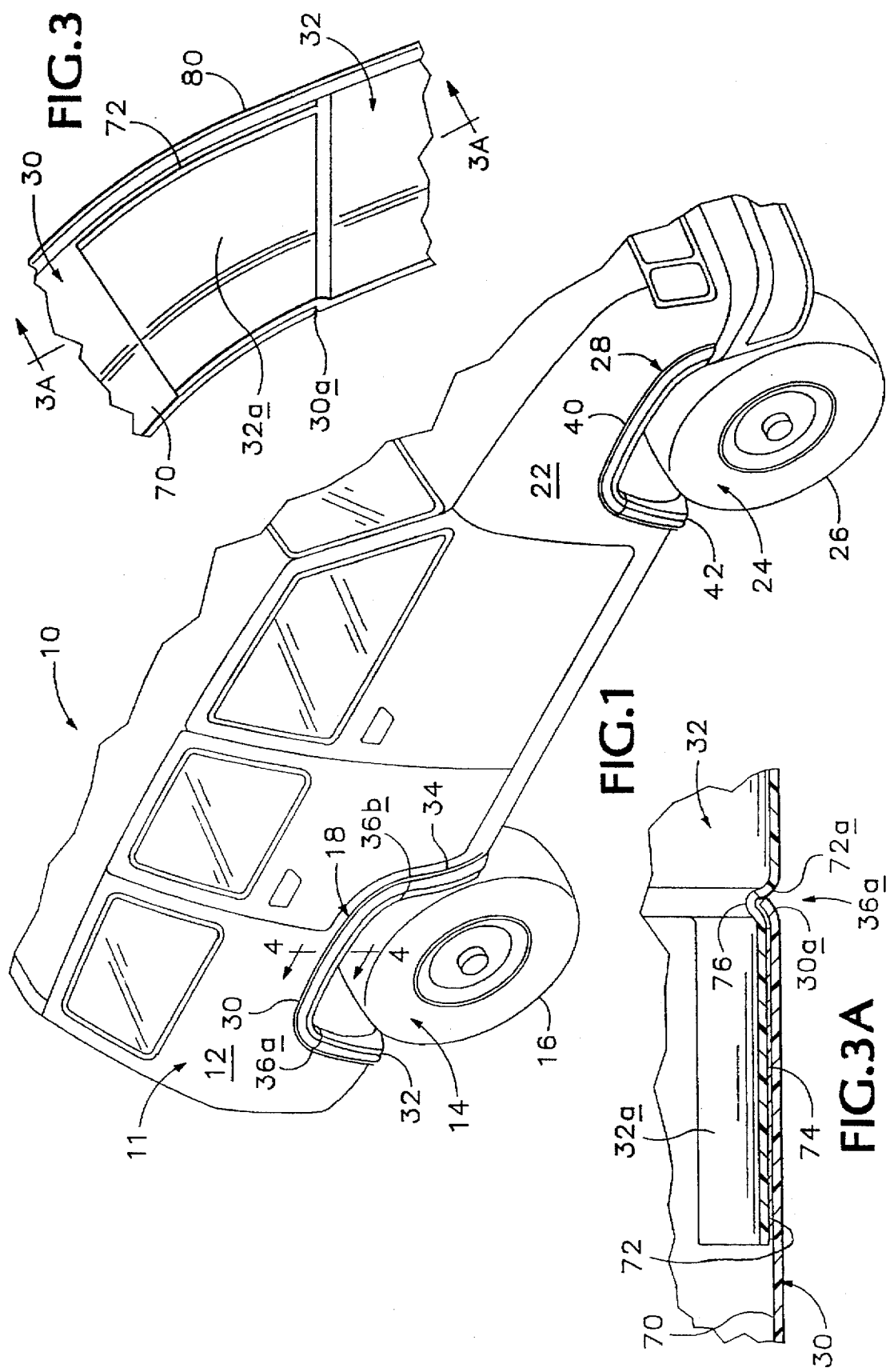

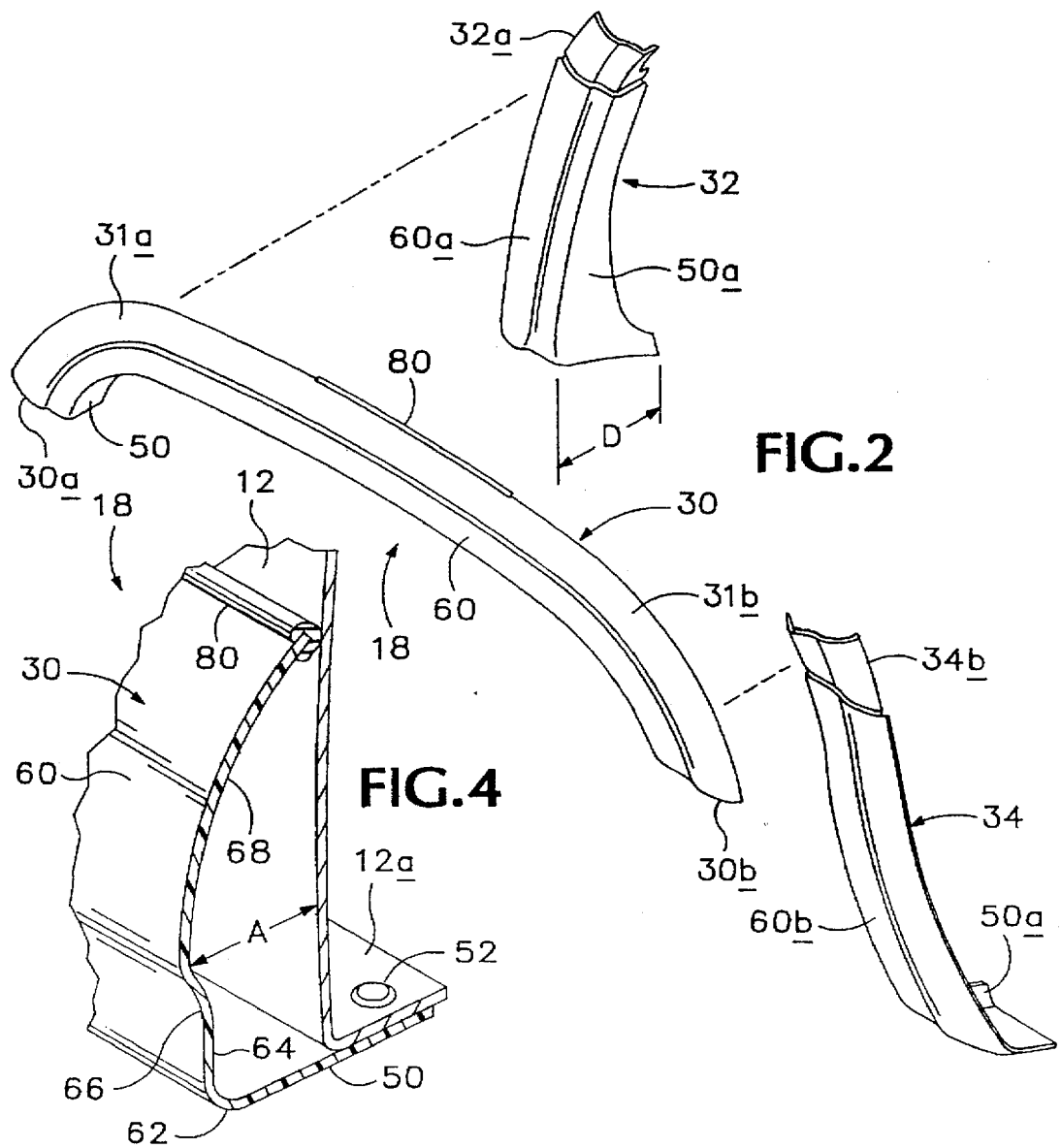
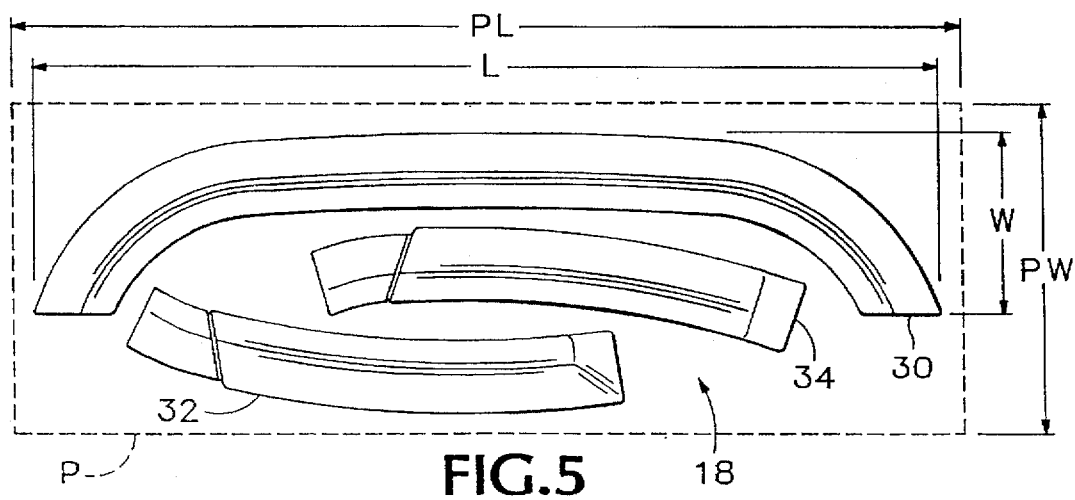

LOW-PROFILE MODULAR FENDER FLARE

TECHNICAL FIELD

The present invention relates generally to vehicle body contour enhancements, and more particularly, to a modular system including plural contour pieces which combine to provide a low-profile fender flare. These contour pieces accommodate storage and shipping in a conventional-size container, but may be combined to provide a fender flare which appears unitary to the nondiscriminating eye.

BACKGROUND OF THE INVENTION

The use of vehicle contour enhancements has become an increasingly popular way of customizing the appearance of a vehicle, of protecting the vehicle's body, and of making vehicles safer where nonstandard wheels are used. Most commonly, these contour enhancements take the form of unitary fender flares which secure to the edge or margin of each wheel opening using attachment mechanism such as clips, brackets or screws. These fender flares typically are made using molded plastic or fiberglass, or are formed via a modified rubber or vinyl compound extrusion method. One such fender flare is described in U.S. Pat. No. 5,238,268, which is entitled "Multiple Piece Vehicle Fender Extension," and which is commonly owned herewith. The disclosure of that patent is incorporated herein by this reference.

In keeping with one of the principle uses of such contour enhancements, it is common to configure each fender flare such that it covers that part of a fender which is adjacent the wheel opening, and spreads radially outwardly from the wheel opening to a distance of several inches from the vehicle body. This provides a bold or rugged appearance which is desirable in most off-road vehicles, while at the same time providing protection for the vehicle's body, and for the vehicle's wheels. Such fender flares actually may be required on vehicle's equipped with oversize wheels due to dangers associated with such wheels. In fact, state or local laws often prohibit wheels from extending beyond the original wheel well openings without additional protection such as that provided by fender flares.

Not all vehicles, though, are intended for off-road use, and many vehicle owners do not desire the rugged appearance associated with conventional fender flares. Correspondingly, most vehicles are not equipped with wheels which extend beyond the confines of standard wheel wells, or which require special protection from on- or off-road hazards. In fact, the vast majority of vehicles employ wheels which fit comfortably within a vehicle's standard wheel wells. On such vehicles, conventional fender flares actually may detract from the classic look of the vehicle, most notably due to the distance which the fender flares extend beyond the vehicle's wheels, and beyond the vehicle body itself. This is not to say, however, that fender flares are undesirable, or that they are unattractive on vehicles intended for street use. To the contrary, many vehicle owners desire a sporty appearance, and/or the protection available from vehicle body contour enhancements. What is needed is a vehicle body contour enhancement in the form of a low-profile fender flare which provides the vehicle with a sporty appearance without detracting from the vehicle's overall style.

Another problem with conventional body contour enhancements relates to the difficulties associated with storage and transport of such devices, particularly where such devices are to be displayed on retail store shelves, or where such devices are shipped directly to customers via a carrier such as United Parcel Service (UPS). In most retail stores, for example, it will be understood that space is extremely limited, and thus that the product packaging size may significantly affect the determination of how a product is to be displayed. Often, larger products such as vehicle fender flares, are not displayed at all, and sometimes are available only by special order. This significantly detracts from product sales. Carriers such as UPS similarly are confronted with space limitations, and thus similarly must take steps to curb the use of large packaging by charging a premium fee for the transport of an oversized-package (generally defined as a package where the sum of its length, twice its width and twice its depth exceeds 84-inches). Unfortunately, fender flares are relatively large items, and are commonly sold in sets of two or four. Therefore, it would be desirable to provide a fender flare configured for packaging in a conventional-size container, and more particularly, for packaging in accordance with standard UPS size guidelines.

One potential solution to the identified packaging problems would be to use a multi-component fender flare wherein plural components are assembled to produce a single fender flare. Although such fender flare arrangements have been proposed, the designs have not been accepted due to their complexity, and due to their effect on the vehicle's overall appearance and style. Further, known modular fender flare arrangements have failed to adequately address packaging concerns, and have required complex fasteners which make application of the devices difficult, and which damage the vehicle body when applied. It therefore would be desirable to provide a fender flare which is assembled from contour pieces to accommodate storage and transport, but which, when combined, provides a contour enhancement having the appearance of a unitary fender flare.

DISCLOSURE OF THE INVENTION

Accordingly, the present invention provides a low-profile modular fender flare constructed from plural contour pieces, the pieces being configured to allow packaging of the disassembled device in a container of conventional size. The contour pieces are shaped for attachment to the vehicle body, each piece being configured to extend along a particular portion of the vehicle's wheel opening. The fender flare thus is assembled by combination of the contour pieces, such pieces typically taking the form of a brow piece with one or more associated leg pieces. The brow piece extends generally horizontally along an upper edge of the wheel opening. The leg pieces extend generally vertically along the side edges of the wheel opening. Combination occurs by mating engagement of the brow piece and the leg piece (or pieces), the brow piece being trough-shaped to define an interior of predetermined contour, and the leg pieces each including an alignment tab with an exterior contoured to fittedly engage the interior of the brow piece at a corresponding end thereof.

In the preferred embodiment, the alignment tabs are formed integrally with the leg pieces, the tabs being defined by what are, for all practical purposes, slightly reduced-size end portions of the leg pieces. Each tab thus is configured with an exterior surface which conforms substantially to the interior surface of the brow piece and secures thereto via an adhesive which is applied therebetween. The tabs may, in fact, be specially shaped to ensure a unitary fender flare appearance when the contour pieces are combined, and may be grooved to ensure proper distribution of the adhesive. For example, by turning the exterior surfaces of the contour pieces inwardly, and by combining the contour pieces such that they overlap to define generally horizontal interface lines which correspond to the vehicle's accent lines, it is possible to give each fender flare assembly the appearance of a unitary fender flare.

Further, by limiting the distance which the fender flare unit extends beyond the vehicle's body, it is possible to provide a low-profile fender flare which may be used as an attractive contour enhancement even where standard-size wheels are used. Typically, each contour piece is defined by a contoured sheet having an inner edge in the form of a lip portion which generally conforms to the shape of the wheel opening, and which projects only minimally from the edge of the wheel opening to a generally perpendicular flange portion. The flange portion is shaped to fit generally conformingly against the vehicle body, preferably by provision of a pair of low-profile protuberant regions separated by an intermediate groove. The first protuberant region is directly connected to the lip portion and extends outwardly from the vehicle body preferably no more than approximately ¾-inch at top dead center of the wheel well opening. The second protuberant region connects to the first protuberant region via the intermediate groove and similarly extends outwardly from the vehicle body preferably no more than approximately ¾-inch at top dead center of the wheel well opening. The second protuberant region terminates in an outer edge which is biased against the vehicle body.

These and additional objects and advantages of the present invention will be more readily understood after a consideration of the drawings and the detailed description which follows.

BRIEF DESCRIPTION OF THE DRAWINGS

FIG. 1 is an isometric view depicting a vehicle which employs front and rear fender flares, each constructed in accordance with a preferred embodiment of the invention.

FIG. 2 is an enlarged and exploded isometric view of the rear fender flare shown in FIG. 1.

FIG. 3 is a further enlarged fragmentary plan view of the rear fender flare, such view depicting a connection joint between adjacent contour pieces.

FIG. 3A is a sectional view taken generally along lines 3A—3A of FIG. 3.

FIG. 4 is an enlarged side sectional view taken along lines 4—4 of FIG. 1 to illustrate attachment of the rear fender flare to the vehicle body.

FIG. 5 is a plan view of a disassembled rear fender flare, such view illustrating a preferred packaging arrangement of such fender flare.

Figure 6:
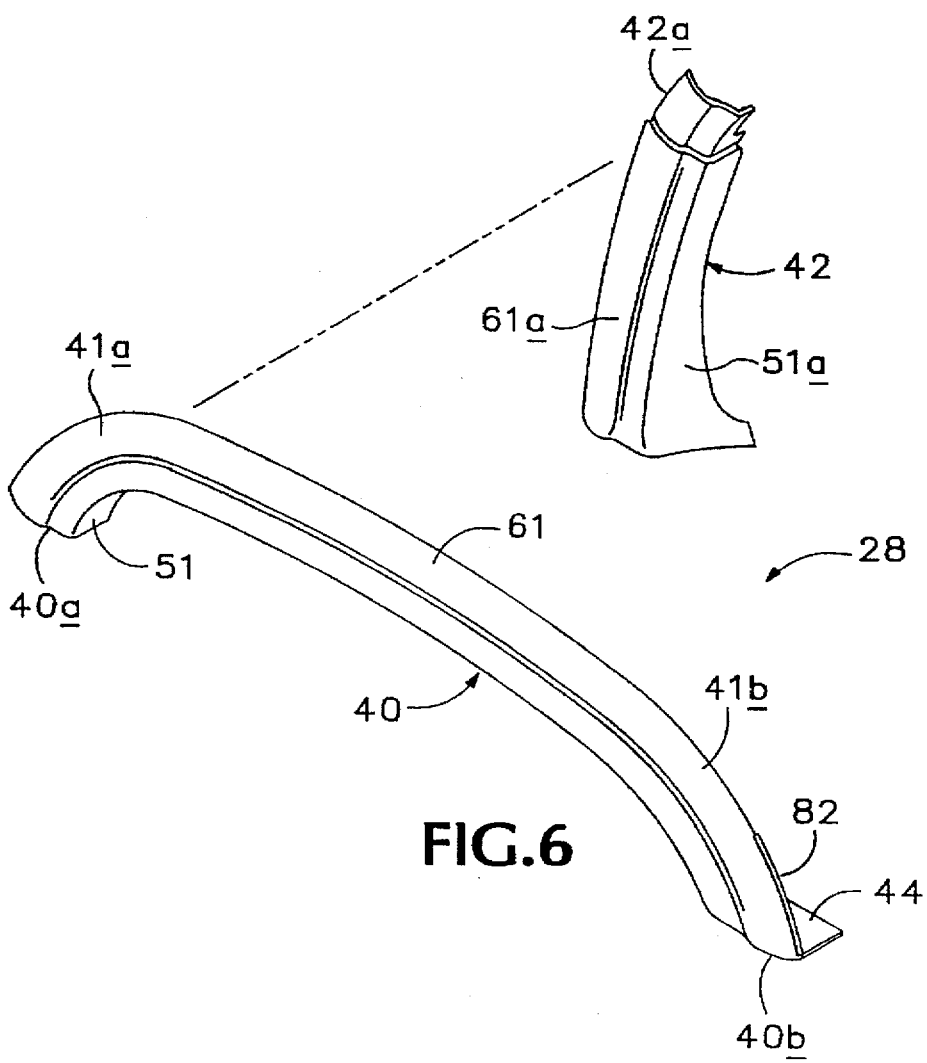
FIG. 6 is an exploded isometric view of the front fender flare shown in FIG. 1.

DETAILED DESCRIPTION OF THE PREFERRED EMBODIMENT AND BEST MODE OF CARRYING OUT THE INVENTION

FIG. 1 shows, at 10, a conventional sport utility vehicle which includes a vehicle body 11 having a rear fender 12 which is contoured to provide the vehicle with an overall style and appearance of an on-road vehicle. Rear fender 12 defines a rear wheel opening 14 which exposes an associated rear wheel 16 of conventional size and style. The rear fender carries a vehicle body contour enhancement in the form of a multi-component rear fender flare 18 which is secured to the vehicle body in an area surrounding the rear wheel opening.

As indicated, vehicle 10 also defines a front fender 22 which is contoured similarly to the rear fender. Front fender 22 defines a wheel opening 24 which houses a front wheel 26 of conventional size and style. The front fender is provided with a multi-component front fender flare 28 which surrounds the front wheel opening. Front fender flare 28 is similar, but not identical, to the rear fender flare as will be described in detail below.

Referring initially to the rear fender flare, it will be noted that such fender flare is constructed to provide a multi-component, low-profile contour enhancement which is readily constructed, and which is easily shipped and stored. The rear fender flare most preferably includes three trough-shaped contour pieces 30, 32, 34, each of which is configured to mount on a predetermined portion of the wheel opening so as to collectively provide a fender flare assembly which has the appearance of a unitary fender flare. Central contour piece 30 takes the form of a brow which extends generally horizontally along an upper edge portion of the wheel opening. Side contour pieces 32, 34 take the form of legs which extend generally vertically downwardly from the brow piece along opposite side edge portions of the wheel opening.

Despite its generally unitary appearance, careful examination of fender flare 18 will reveal a pair of visible connection joints 36a, 36b, which are defined at the interface between brow piece 30 and each associated leg piece 32, 34. These connection joints typically appear as horizontal accent lines such as those which commonly are seen on modern sport utility vehicles. Correspondingly, connection joints 36a, 36b go virtually unnoticed to all but the extremely discriminating eye. The connection joints also are referred to herein as interface lines.

FIG. 2 depicts rear fender flare 18 in exploded isometric view, providing an illustration whereby assembly of the rear fender flare may be understood. As indicated, the rear fender flare's contour pieces 30, 32, 34 are configured for fitted combination, each piece being formed to mate in predetermined fashion with a corresponding contour piece. Brow piece 30, for example, is an elongate, generally trough-shaped element (FIG. 4) which extends along a generally horizontal portion of wheel opening 14, but which defines bends 31a, 31b adjacent opposite open ends 30a, 30b. The bends mimic turns in wheel opening 14, providing for orthogonal alignment of the leg pieces as will be described below. Contour piece 32 takes the form of a rear leg piece, being configured with an arcuate alignment tab 32a which matingly fits within open end 30a of brow piece 30. Contour piece 34 takes the form of a forward leg piece having alignment tab 34b which arcs oppositely to alignment tab 32a. Alignment tab 34b matingly fits within open end 30b of brow piece 30. Preferably, the alignment tabs fit telescopingly within the brow piece's open ends.

As indicated, each of the rear fender flare's contour pieces includes a lip portion 50, 50a, 50b which conforms generally to the shape of a corresponding portion of the wheel opening, and a flange portion 60, 60a, 60b, which extends angularly from the lip portion to engage the vehicle body. The lip portion and flange portion typically are generally perpendicular to one another, but may define an acute angle along various sections of their lengths so as to bias the flange portion against the fender when the lip portion is secured to the wheel opening as will be described. Such bias may, in fact, exist along the entire length of the fender flare.

Brow piece 30, for example, includes a lip portion 50 and a flange portion 60 which together define a trough-shaped interior of predetermined contour. Typically, the brow piece is of generally uniform thickness, giving the brow piece interior a contour which mimics the contour of the brow piece's exterior. Leg piece 32 similarly includes a lip portion 50a and a flange portion 60a which are shaped complementary to the corresponding lip and flange portions of brow piece 30 in order to give the fender flare a unitary appearance as previously described. Leg piece 34 includes a lip portion 50a and a flange portion 60b which similarly are configured to enhance the unitary appearance of fender flare 18. Further, lip portion 50a may act as a splash guard or mud guard to protect the vehicle body, thus accounting for the rear leg piece's downwardly increasing depth D.

Turning now to FIGS. 3 and 3A, a more detailed explanation of the fender flare's assembly is provided, such assembly being shown illustratively by reference to the combination of brow piece 30 and leg piece 32. Brow piece 30, it will be understood, combines similarly with leg piece 34.

As indicated, brow piece 30 defines a trough-shaped interior surface 70 of predetermined contour which extends along the brow piece from its open end. Because the end is open, it is possible to telescopingly insert tab 32a of contour piece 32 into end 30a of brow piece 30 so as to matingly combine the brow piece and leg piece. Tab 32a, it will be understood, has an exterior surface 72 which mimics the contour of interior surface 70 so as to provide for fitted attachment of tab 32a to the interior of contour piece 30. This accommodates preliminary alignment of the leg and brow pieces. The generally arcuate nature of the brow piece and corresponding leg piece alignment tab in the vicinity of bend 31a (see FIG. 2) accommodates orthogonal alignment of leg piece and brow piece.

The contour pieces are secured together by application of an adhesive 74 which typically is applied to the alignment tab. A channel arrangement such as that defined by channel 76 serves to control the flow of the adhesive, typically by defining a boundary of flow of the adhesive to prevent flow of the adhesive onto the exterior surface of the brow and leg pieces, and provides a space for lip turn-down as will be described further below. In the preferred embodiment, where the contour pieces are formed from of a molded plastic, an adhesive resin such as conventional pipe cement is employed to ensure that the combination of the contour pieces is secure.

FIG. 3A also serves to illustrate the nature of the connection joints, and the features which minimize the appearance of such joint. Toward this end, it will be noted that contour piece 30 turns inwardly at end 30a, and that alignment tab 32a is somewhat recessed relative to the remainder of the leg piece 32. Contour piece 32 thus appears to the observer to turn inwardly at 72a. The connection joint between the brow piece and leg piece thus appears only as a surface dip, minimizing the appearance of interface line 36a.

FIG. 4 shows a cross-section of contour piece 30 in an area where it attaches to the rear fender, providing a detailed illustration of the interior and exterior contour of the brow piece. As indicated, contour piece 30 includes a lip portion 50 which attaches to the rear wheel opening via suitable fasteners such as rivet 52. Rivet 52, it will be noted, secures to body portion 12a which defines the edge of the wheel opening. Extending generally perpendicularly from lip portion 50 is flange portion 60 which will be seen to include a bend 62, defining the intersection between lip portion 50 and flange portion 60. The flange portion, in turn, includes a first protuberant region 64, followed by an intermediate groove or dip 66, and then a second protuberant region 68. The second protuberant region extends upwardly and inwardly to engage the vehicle body as shown. An upper edge of the second protuberant region is covered by a resilient strip 80 which typically is made of a material such as rubber to protect the vehicle fender from damage caused by contact with the flange portion of the fender flare. The two leg pieces are similarly contoured to provide a fender flare with a substantially fluid contour across all three contour pieces.

In accordance with one aspect of the invention, it will be noted that the depicted fender flare is indeed a low-profile fender flare, the flange portion preferably extending no more than approximately ¾-inch from the vehicle body, and no more than approximately 4-inches from the wheel opening along the vehicle body. The distance which the flange extends from the vehicle body is indicated at A in FIG. 4.

Turning now to FIG. 5, a packaging arrangement is shown so as to illustrate the benefit which may be realized by modularizing the fender flare in the manner described above. As indicated, fender flare 18 may be shipped prior to assembly in a package P of conventional size. This is accomplished, at least in part, by dividing the fender flare into contour pieces which allow for shipping, for example, in the depicted configuration. It will be appreciated, that contour piece 30 may be designed so as to have a length L which is no more than approximately 40-inches and a width W which is no more than approximately 12-inches. Contour pieces 32 and 34, which typically are both shorter and narrower, are selected to accommodate placement in the package as shown, or may be placed within the package on their sides (i.e., rotated 90-degrees on an axis extending along their lengths). Package P thus will have an overall length PL of no more than approximately 40-inches and an overall width PW of no more than approximately 14-inches. The depth of the package typically is related to the depth of the deepest contour piece. In the depicted embodiment, the contour pieces have a depth D of less than approximately 8-inches.

Because fender flare systems typically are sold in sets of two or four, and because the interior contour of each piece generally mimics its exterior contour, it will be appreciated that such contour pieces may be stacked or rested one in the other (and separated by protective wrapping), thereby increasing the depth, but leaving the length and width unaffected. Therefore, in accordance with one of the preferred features of the invention, the sum of the length and girth (twice the width plus twice the depth) of the package is held below a maximum of 84-inches. The package thus will not be classified by UPS as an oversized package.

Turning now to a description of front fender flare 28, it will be noted that such fender flare includes an elongate brow piece 40 having opposite ends 40a, 40b, each of which is in the vicinity of a contour piece bend 41a, 41b. One end of brow piece 40 is open, allowing for insertion of an alignment tab 42a of leg piece 42. The other end of the brow piece is closed, as indicated at 44 in FIG. 6. Like the brow piece of the rear fender flare, brow piece 40 is generally trough-shaped, the brow piece's contour being defined by a lip portion 51 and a generally perpendicular flange portion 61. Leg piece 42 includes a similarly shaped lip portion 51a and flange portion 61a, and an alignment tab 42a which is configured for mating engagement with the open end of the brow piece. The interior surface of contour piece 40 has a predetermined contour which mimics the contour of the exterior surface of tab 42a. A resilient strip 82 extends along an edge of the fender flare system to protect the vehicle body from damage. Front fender flare 28 thus is very similar to rear fender flare 18, but for the use of only a single leg piece and the closure of the brow piece's forward end.

Figure 7:
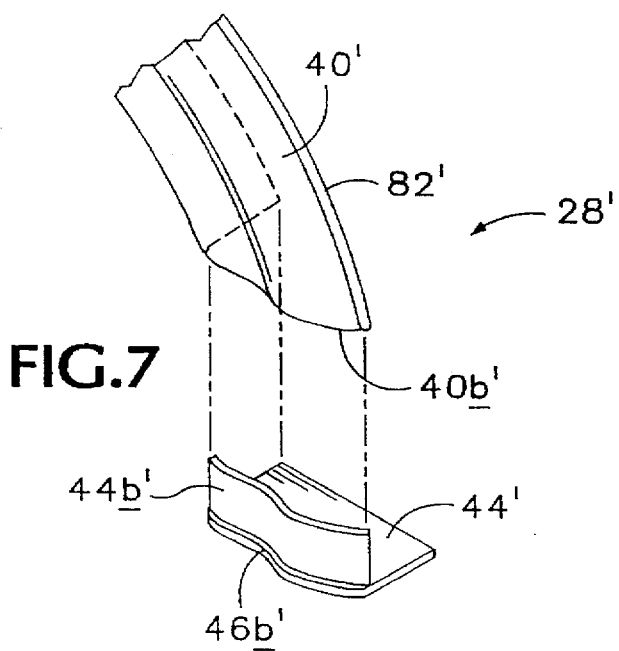
FIG. 7 is a fragmentary exploded isometric view of an alternative embodiment front fender flare.

An alterative embodiment of the fender flare 28 is shown at 28' in FIG. 7, such fender flare including a generally horizontal brow piece 40' with both ends open (one of which are shown at 40b'). By this arrangement, it will be understood that a cap 44' may selectively be employed to close the forward end of the brow piece. In the depicted embodiment, the brow piece defines an interior surface of predetermined contour and the cap includes a tab 44b' having an exterior surface which conforms to an interior surface of the brow piece. A channel 46b' is defined on the alignment tab of the cap to limit the distribution of an adhesive (not shown) which is applied to the tab to secure the cap in place. This arrangement allows further adaptability of the fender flare, it being possible to selectively choose to apply either a single leg piece, as indicated in FIG. 6, or to apply a pair of leg pieces as shown in FIG. 2.

While the present invention has been shown and described with reference to the foregoing operational principles and preferred embodiment, it will be apparent to those skilled in the art that other changes in form and detail may be made therein without departing from the spirit and scope of the invention as defined in the appended claims.

What is claimed is:

1. A low profile fender flare for mounting on a vehicle body in an area surrounding a wheel opening of the vehicle, said fender flare comprising:

an elongate, generally trough-shaped first contour piece attachable to the vehicle body alone a first edge portion of the wheel opening, said first contour piece including a bend whereby said first contour piece turns downwardly in a generally vertical plane to define an arc of an arcuate end of said first contour piece, said first contour piece defining an interior of predetermined contour which extends from said arcuate end of said first contour piece;

an elongate generally trough-shaped second contour piece attachable to the vehicle body along a second edge portion of the wheel opening, adjacent said first edge portion and extending generally downwardly from said first edge portion, said second contour piece having an arcuate second-piece alignment tab with a bend whereby said second-piece alignment tab turns upwardly and inwardly in said generally vertical plane to define an arc of said second-piece alignment tab corresponding to said arc of said first contour piece, said second contour piece having an exterior of said predetermined contour, thereby to enable aligned mating combination of said second-piece alignment tab with said arcuate end of said first contour piece.

2. The fender flare of claim 1, wherein said first contour piece also includes a bend whereby said first contour piece turns downwardly in a generally vertical plane to define an opposite arc of another end of said first contour piece, said interior of predetermined contour also extending from said other end of said first contour piece, said system further comprising:

an elongate, generally trough-shaped third contour piece attachable to the vehicle body along a third edge portion of the wheel opening, also adjacent said first edge portion, said third contour piece having an arcuate third-piece alignment tab with a bend whereby said third-piece alignment tab turns upwardly and inwardly in said generally vertical plane and opposite to said arc of said second-piece alignment tab to define an arc of said third-piece alignment tab corresponding to an opposite arc of an opposite arcuate end of said first contour piece, said third contour piece having an exterior of said predetermined contour, thereby to enable aligned, mating combination of said third-piece alignment tab with said other end of said first contour piece.

3. A fender flare for mounting on a vehicle body in an area surrounding a wheel opening of the vehicle, said fender flare comprising:

an elongate first contour piece including a first lip portion which conforms generally to the shape of the wheel opening of the vehicle body along a first generally horizontal edge portion of the wheel opening, a first flange portion which extends angularly from said first lip portion to engage the vehicle body in an area surrounding the wheel opening, said first contour piece including a bend whereby said first contour piece turns downwardly in a generally vertical plane to define an arc of a generally arcuate open end, and wherein said first flange portion defines an interior surface of predetermined contour, and an elongate second contour piece including a second lip portion which conforms generally to the shape of the wheel opening of the vehicle body along a second generally vertical edge portion of the wheel opening, and a second flange portion which extends angularly from said second lip portion to engage the vehicle body in an area surrounding the wheel opening, said second flange portion defining a generally arcuate alignment tab which includes a bend whereby said alignment tab turns upwardly and inwardly in said generally vertical plane to define an arc of said alignment tab corresponding to said arc of said generally arcuate open end of said first contour piece, said alignment tab being configured to mate with said generally arcuate open end of said first contour piece, said alignment tab having an exterior surface which conforms to the interior surface contour of said first flange portion, and thereby enables aligned fitted combination of said first and second contour pieces.

4. The fender flare of claim 3, wherein said first contour piece is secured to said second contour piece via an adhesive applied in an area intermediate said exterior surface of said alignment tab and said interior surface of said first contour piece.

5. The fender flare of claim 4, wherein said adhesive is fluid, said alignment tab defining a channel arrangement whereby flow of said adhesive is controlled.

6. The fender flare of claim 5, wherein said channel arrangement includes an interface channel which extends transversely across said alignment tab to define a boundary of flow of said adhesive.

7. The fender flare of claim 3, wherein said first and second contour pieces matingly combine, defining a generally horizontal connection joint generally in alignment with said first contour piece.

8. A low profile fender flare for mounting on a vehicle body in an area surrounding a wheel opening of the vehicle, said fender flare comprising:

an elongate brow piece extending in a generally vertical plane for attachment to the vehicle body along a generally horizontal upper edge portion of the wheel opening, said brow piece including a first lip portion which conforms generally to the shape of the wheel opening along the upper edge portion and a first flange portion which extends angularly from said first lip portion to engage the vehicle body, said brow piece including a generally horizontal segment and a pair of oppositely arcing end segments which curve oppositely downwardly from said horizontal segment in said generally vertical plane to define a pair of arcs of generally arcuate, opposite open end segments, said first flange portion defining corresponding interior surfaces, each of predetermined contour; and a pair of elongate leg pieces, for attachment to the vehicle body along opposite, generally vertical side edge portions of the wheel opening which extend downwardly from the generally horizontal upper edge portion of the wheel opening, said leg pieces each including a second lip portion which conforms generally to the shape of the wheel opening along a corresponding side edge portion, and a second flange portion which extends angularly from said second lip portion to engage the vehicle body, each second flange portion defining a generally arcuate alignment tab which curves upwardly and inwardly in said generally vertical plane to define an arc in said generally vertical plane whereby said alignment tab is configured to mate with a corresponding open end of said brow piece, each tab having an exterior surface which conforms with a corresponding interior surface of said first flange portion of said brow piece, thereby to enable aligned combination of said brow piece, and, on either side thereof, said leg pieces such that said brow piece and leg pieces enhance a contour of the vehicle body in the area surrounding a wheel opening of the vehicle.

9. The fender flare of claim 8, wherein said leg pieces are secured oppositely to said brow piece via an adhesive applied in an area intermediate said exterior surface of each alignment tab and said corresponding interior surfaces of said brow piece.

10. The fender flare of claim 9, wherein said brow piece and leg pieces matingly combine, defining a generally horizontal connection joint generally in alignment with the brow piece.

* * * * *